(12) United States Patent
Di Sopra et al.

(10) Patent No.: US 11,649,939 B2
(45) Date of Patent: May 16, 2023

(54) AUTOMOTIVE LIGHTING AND/OR SIGNALING DEVICE AND ASSEMBLY METHOD THEREOF

(71) Applicant: MARELLI AUTOMOTIVE LIGHTING ITALY S.p.A., Venaria Reale (IT)

(72) Inventors: Federico Di Sopra, Tolmezzo (IT); Domenico Ferigo, Tolmezzo (IT); Fabrizio Rovesti, Tolmezzo (IT)

(73) Assignee: MARELLI AUTOMOTIVE LIGHTING ITALY S.p.A., Venaria Reale (IT)

( * ) Notice: Subject to any disclaimer, the term of this patent is extended or adjusted under 35 U.S.C. 154(b) by 0 days.

(21) Appl. No.: 17/534,881

(22) Filed: Nov. 24, 2021

(65) Prior Publication Data

US 2022/0163178 A1  May 26, 2022

(30) Foreign Application Priority Data

Nov. 25, 2020 (EP) .................................... 20425052

(51) Int. Cl.
*F21S 41/19* (2018.01)
*F21S 41/32* (2018.01)
(Continued)

(52) U.S. Cl.
CPC .......... *F21S 41/192* (2018.01); *B60Q 1/0433* (2013.01); *B60Q 1/2626* (2013.01);
(Continued)

(58) Field of Classification Search
CPC .......... B29C 65/1687; B29C 66/73343; B29C 66/73361; B29C 66/73365; B29C 66/712;
(Continued)

(56) References Cited

U.S. PATENT DOCUMENTS

2007/0133220 A1\* 6/2007 Watanabe ............. F21S 41/295
362/544
2017/0219178 A1 8/2017 Faffelberger et al.

FOREIGN PATENT DOCUMENTS

CN 205749972 U 11/2016
CN 207702382 U 8/2018
(Continued)

OTHER PUBLICATIONS

Search English translation of DE-102017120244-A1 (Year: 2007).\*
(Continued)

*Primary Examiner* — Omar Rojas Cadima
(74) *Attorney, Agent, or Firm* — Howard & Howard Attorneys PLLC (57) ABSTRACT

A lighting and signaling device for automotive vehicles, comprising a container body delimiting a containment housing closed by a lenticular body, which accommodates at least one first light source and is closed by a lenticular body, a first light guide configured to receive as input at least partially the light beam produced by the first light source, transmits the light beam by total internal reflection along a first prevailing propagation direction and sends it as output from the lenticular body. A fixing and/or screen element, opaque to the light beam is associated with the first light guide at a first interface wall, and is fixed either directly or indirectly onto the container body to mechanically block the first light guide onto the container body. The first light guide is mechanically fixed to the fixing and/or screen element by at least one first welding portion which projects from the first interface wall.

16 Claims, 5 Drawing Sheets

(51) Int. Cl.
  *F21S 43/14* (2018.01)
  *F21S 41/141* (2018.01)
  *F21S 43/31* (2018.01)
  *F21S 43/235* (2018.01)
  *B60Q 1/04* (2006.01)
  *B60Q 1/26* (2006.01)

(52) U.S. Cl.
  CPC ........... *F21S 41/141* (2018.01); *F21S 41/322* (2018.01); *F21S 43/14* (2018.01); *F21S 43/235* (2018.01); *F21S 43/315* (2018.01)

(58) Field of Classification Search
  CPC ............ B29C 65/1635; B29C 65/1654; B29C 66/114; B29C 65/1616; B29C 65/1661; B29C 66/30223; B29C 66/301; B29C 66/545; B29C 66/652; B29C 66/21; B29C 66/30221; B29C 66/54; B29C 65/08; F21S 43/26; F21S 43/00; F21S 43/27; F21S 43/51; F21S 43/235; F21S 43/239; F21S 43/243; F21S 41/24; F21S 41/285; F21V 17/101; B60Q 3/62
  See application file for complete search history.

(56) References Cited

FOREIGN PATENT DOCUMENTS

| CN | 208720100 U | 4/2019 | |
|---|---|---|---|
| CN | 210462910 U | 5/2020 | |
| CN | 210601455 U | 5/2020 | |
| DE | 102017120244 A1 * | 3/2019 | ........... B60Q 1/2607 |
| EP | 2816276 A2 | 12/2014 | |
| EP | 2924479 A2 | 9/2015 | |
| FR | 2967235 A1 | 5/2012 | |
| JP | 2008117711 A | 5/2008 | |
| WO | 2020170922 A1 | 8/2020 | |

OTHER PUBLICATIONS

Communication dated May 11, 2021 transmitting the Search Report for European Patent Application No. 20425052.6 dated Apr. 30, 2021.

* cited by examiner

AUTOMOTIVE LIGHTING AND/OR SIGNALING DEVICE AND ASSEMBLY METHOD THEREOF

CROSS-REFERENCE TO RELATED APPLICATIONS

The present application claims priority to and all the benefits of European Patent Application No. 20425052.6, filed on Nov. 25, 2020, which is hereby expressly incorporated herein by reference in its entirety.

BACKGROUND OF THE INVENTION

1. Field of the Invention

The present invention relates to an automotive lighting and/or signaling device and assembly method thereof.

2. Description of the Related Art

The term automotive lighting and/or signaling device is used here in a very broad sense to comprise an automotive lamp, either rear or front, the latter also named a headlight or headlamp.

As known, an automotive light is a device intended to provide a lighting and/or signaling function of the vehicle, such as a position light, a turn signal, a brake light, a rear fog lamp, a reversing lamp, a dipped beam headlamp, a main beam headlamp and the like.

Furthermore, the term is also understood to comprise a ceiling light, dashboard or part thereof; thus, the automotive lighting and/or signaling device can be placed either inside or outside the vehicle.

As known, such automotive lighting and/or signaling devices substantially comprise a hollow container body, which internally accommodates at least one light source, and which is closed by an external lenticular body.

However, the lighting and/or signaling devices on the market today are provided with sophisticated lighting assemblies, in which the light source, in particular of the LED type, is coupled, for example, to at least one light guide which receives the light beam produced by the light source and transmits it towards the lenticular body.

The light guide must be permanently fixed inside the lighting and/or signaling device of the vehicle, securing the light guide, for example, to the container body, or any element accommodated within it, such as a support, a bezel, etc.

Alternatively, the light guide may simply be attached to an opaque element to prevent the light from escaping from the light guide. The opaque element can thus be connected to the walls of the light guide to provide such a wall with a sort of light barrier. This may be indispensable, for example, if the walls of the light guide do not meet the condition of total internal reflection, which is also indicated by the acronym TIR, or, if it is necessary to prevent any leaking/leakage of light through a TIR wall of the light guide.

In any event, the operation of fixing the light guide inside the light is delicate and requires a fixing which is both precise and durable.

For example, solutions in which the light guide is mechanically fixed using screws, brackets and the like are known in the prior art.

It is also known to fix the light guide by welding, in particular by ultrasonic welding. Ultrasonic welding is certainly effective from a mechanical point of view, but it is relatively slow and expensive.

In any event, it is apparent that a light guide, like any other element of the device having optical functionality, must not display the slightest alteration during its fixing. The formation of scars/traces on a wall of the light guide, e.g., intended for propagation by total internal light reflection, could create problems in terms of reflection of the light rays propagating inside the light guide. Indeed, at said scars/traces, said rays could escape from the light guide, thus locally losing the TIR property, or in any event, they could be improperly deviated, creating bright spots, or shadow areas on a light exit surface of the light guide. In particular, there is a tendency to fix the light guide at portions of the light guide, such as base plates or appendages, which have been specially designed so that the integrity of the light guide walls with optical functionality is not locally compromised. Nevertheless, such methods are rather slow and cumbersome, and they are unsuitable for mass production to the detriment of costs and production time.

SUMMARY OF THE INVENTION

The need is thus felt in the art to make available an automotive lighting and/or signaling device which makes it possible to solve the technical problems mentioned with reference to the known art.

Such a requirement is met by an automotive lighting and/or signaling device and by an assembly method of an automotive lighting and/or signaling device, which ensures that a light guide is connected inside the device so that the walls of the light guide having an optical function are not locally modified or altered.

Other objects, features and advantages of the present invention will be readily appreciated as the same becomes better understood after reading the subsequent description taken in connection with the accompanying drawings.

BRIEF DESCRIPTION OF THE DRAWINGS

Elements or parts in common to the embodiments described will be indicated hereafter using the same reference numerals.

DETAILED DESCRIPTION OF THE INVENTION

Figure 1:
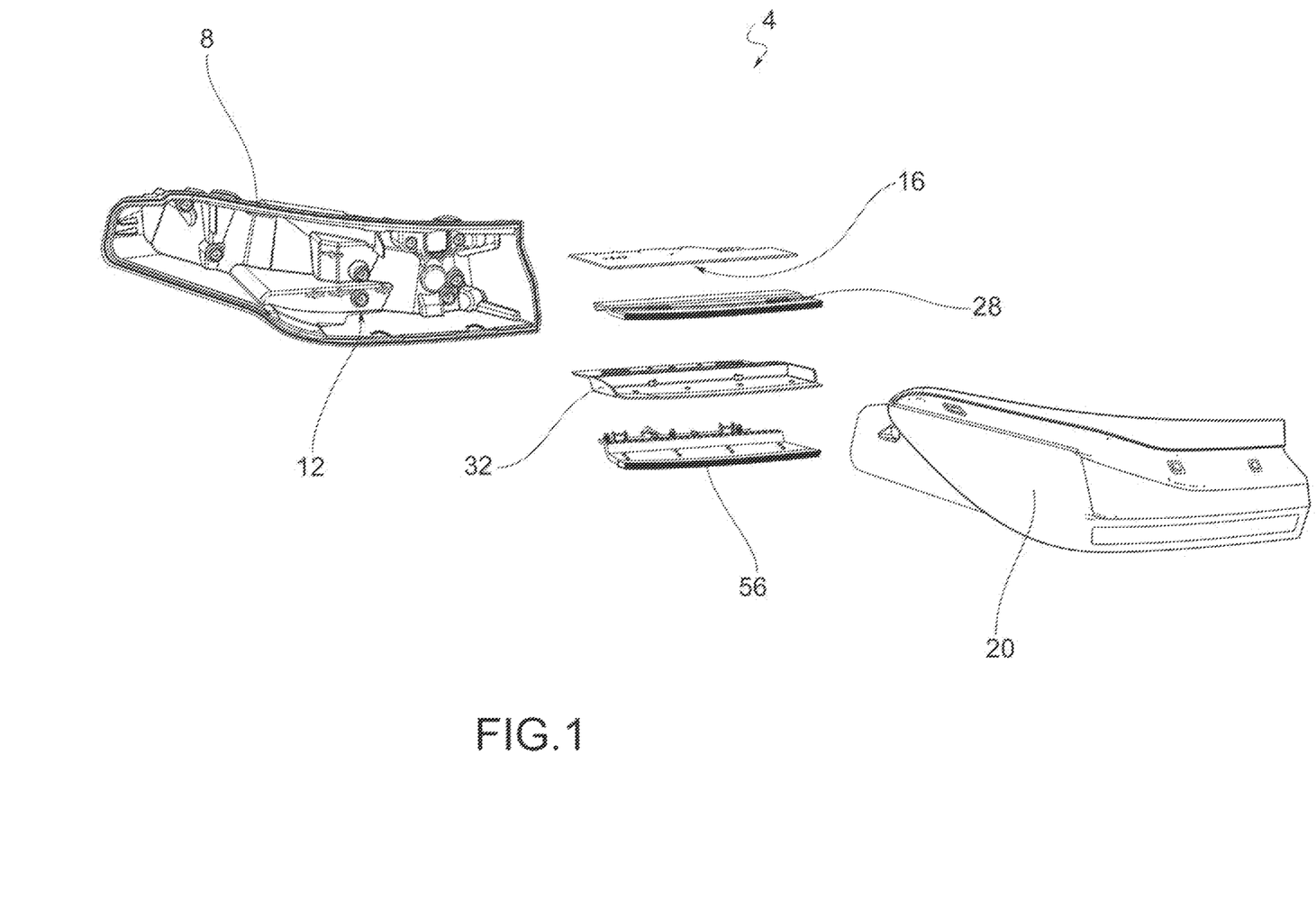
FIG. 1 is a perspective view, with separated parts, of a lighting and/or signaling device according to an embodiment of the present invention.
Figure 2:
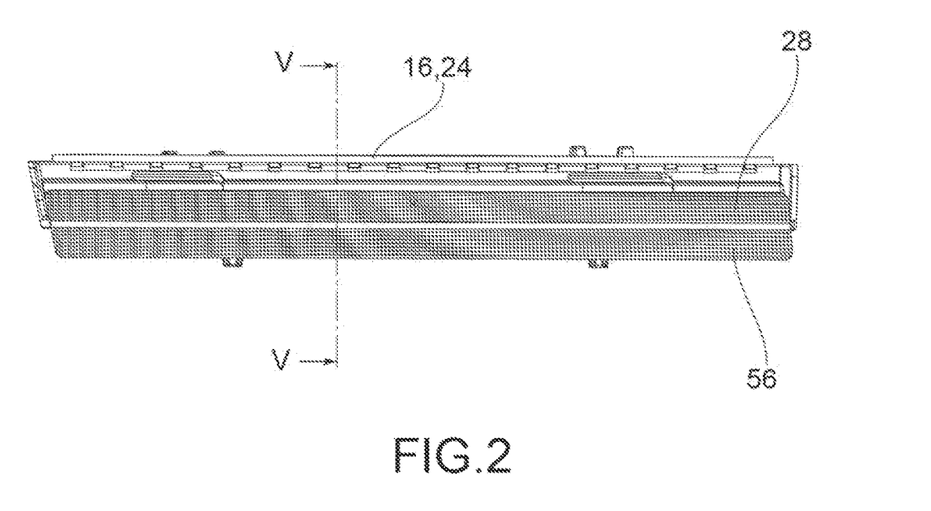
FIG. 2 is a perspective view, in an assembled configuration, of the light guides of the lighting and/or signaling device in FIG. 1.
Figure 3:
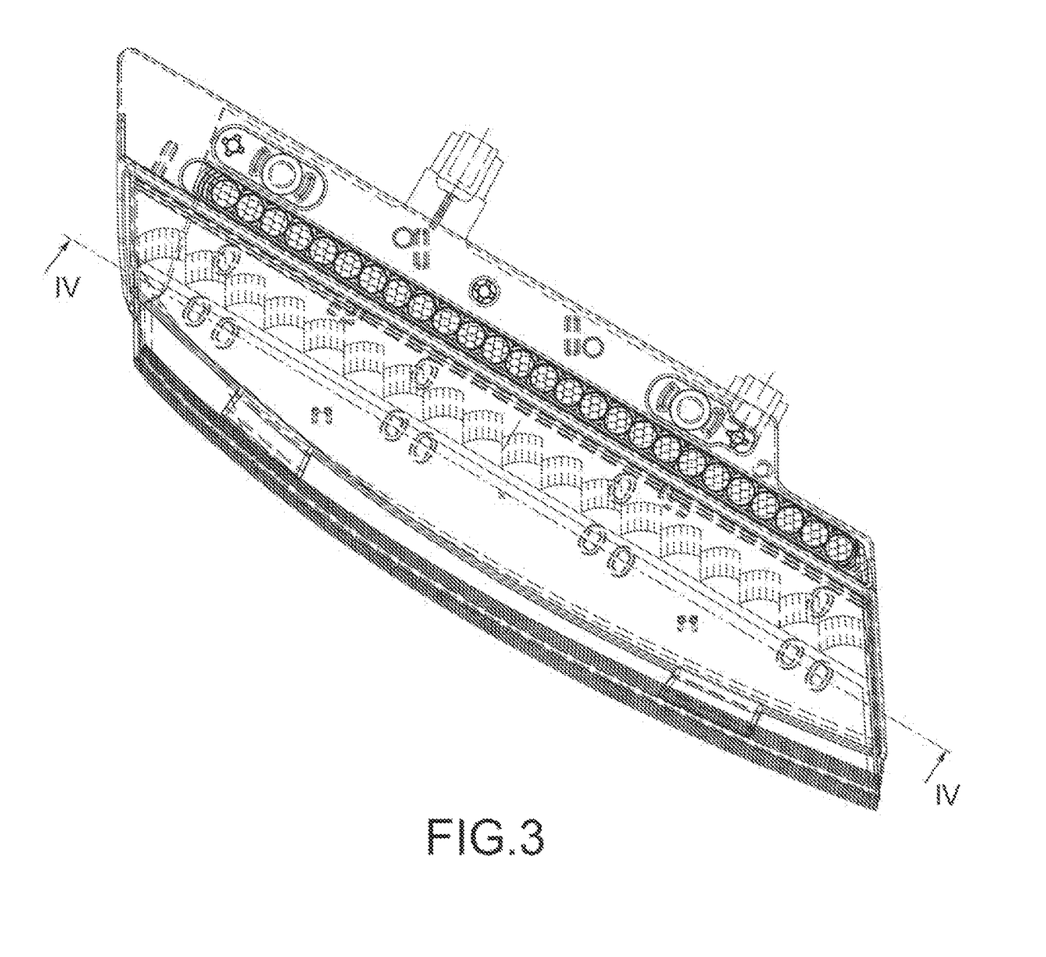
FIG. 3 is a plan view, in an assembled configuration, of the light guides of the lighting and/or signaling device in FIG. 1.
Figure 4:
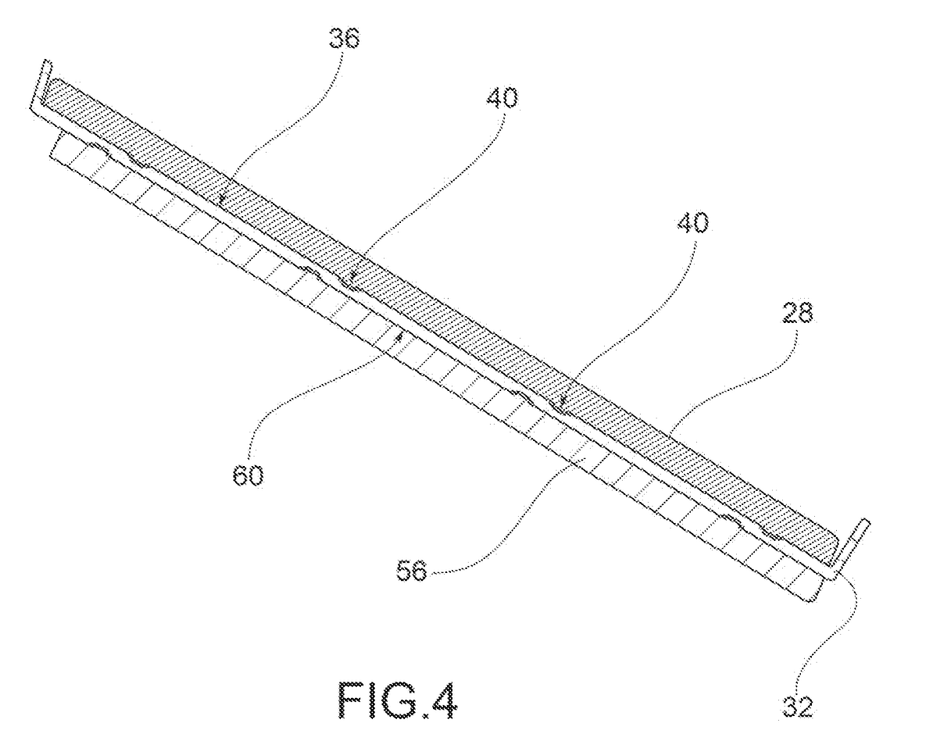
FIG. 4 is a section view of the light guides of the lighting and/or signaling device in FIG. 1, taken along section plane IV-IV shown in FIG. 3.
Figure 5:
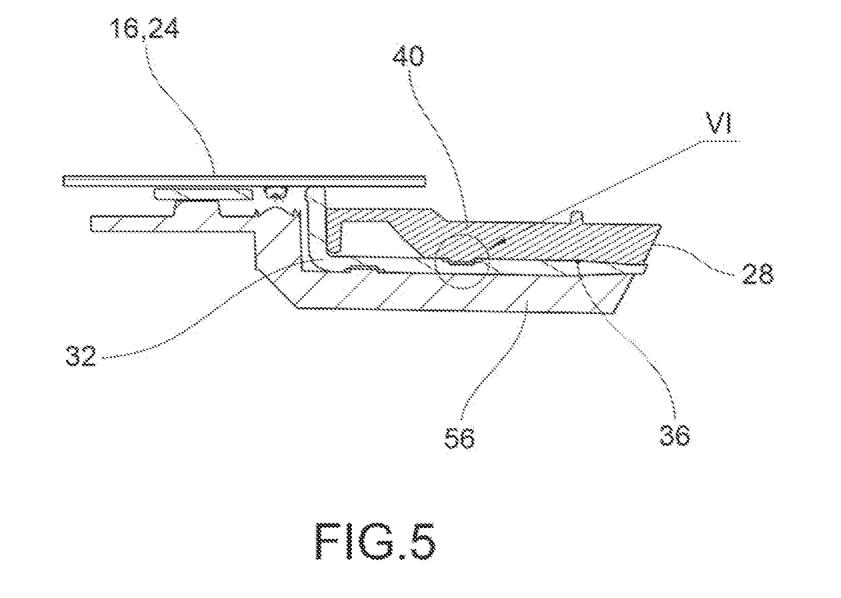
FIG. 5 is a section view of the light guides of the lighting and/or signaling device in FIG. 1, taken along section plane V-V shown in FIG. 3.
Figure 6A:
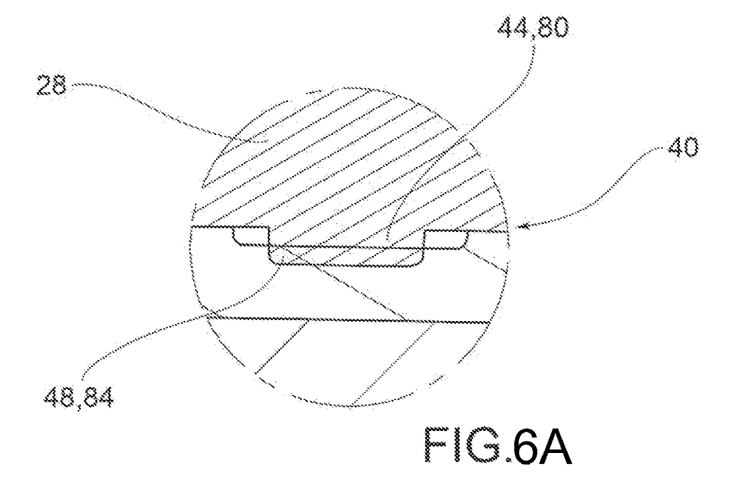
FIGS. 6A-6C show the enlarged detail VI shown in FIG. 5 according to possible embodiments.
Figures 6B, 6C:
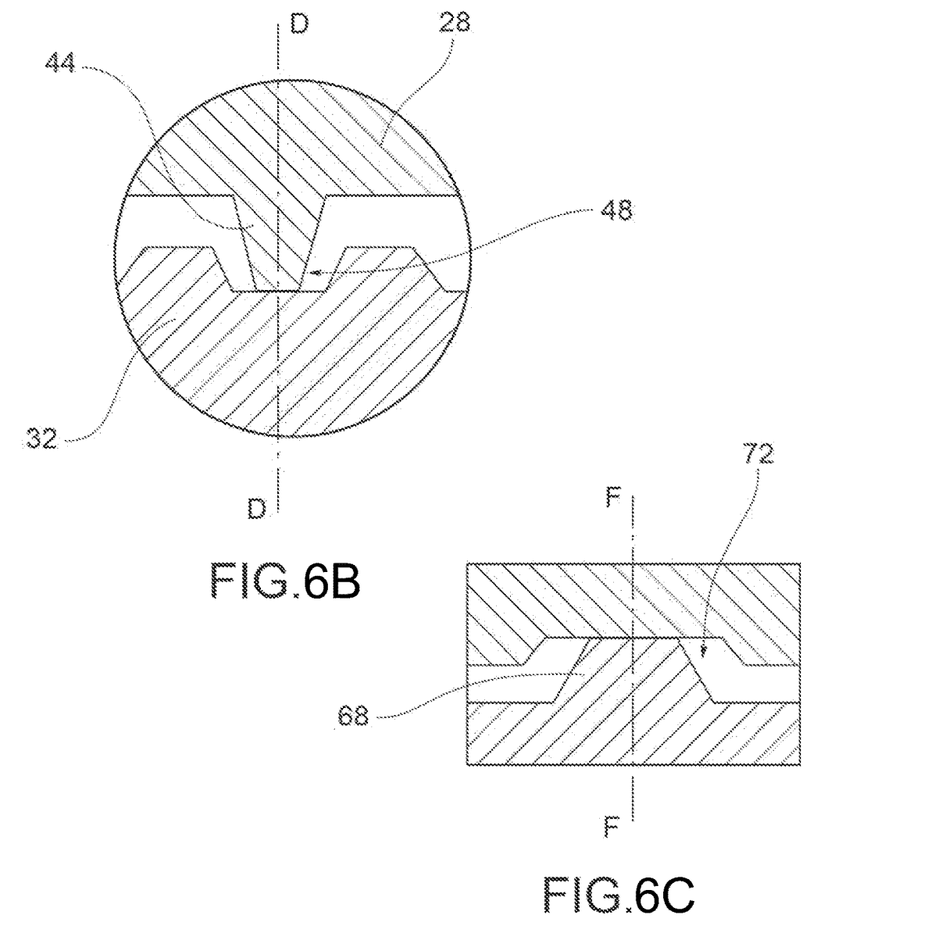
Figure 7:
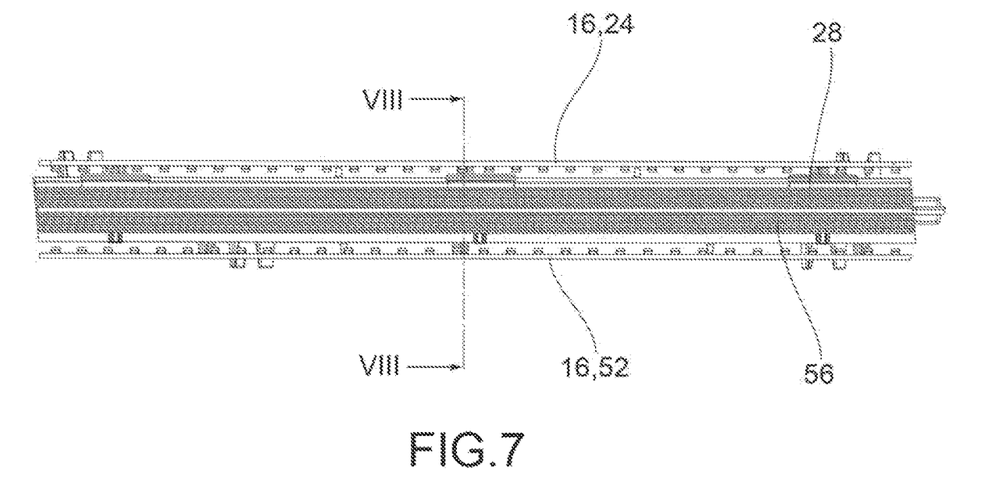
FIG. 7 is a front view, in an assembled configuration, of the light guides of a lighting and/or signaling device according to a further embodiment of the present invention.
Figure 8:
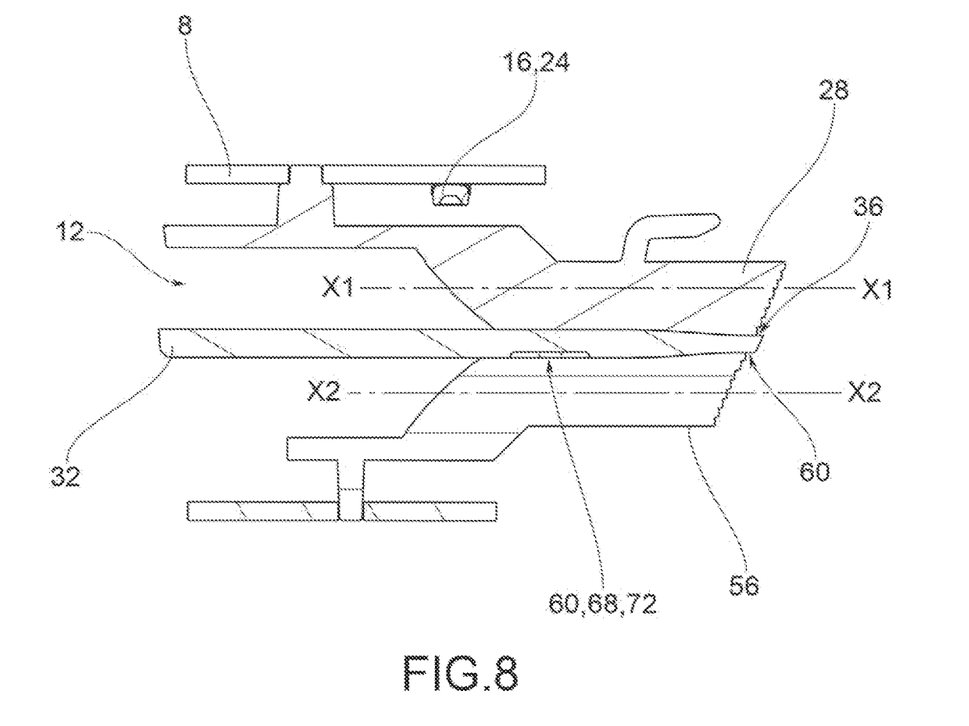
FIG. 8 is a section view of the light guides of the lighting and/or signaling device in FIG. 7, taken along section plane VIII-VIII shown in FIG. 7.

With reference to the aforesaid figures, reference numeral 4 indicates a lighting and/or signaling device, such as automotive light, to which reference will be made hereinafter without because of this losing in generality.

As mentioned above, the expression "lighting and/or signaling device" means either an automotive rear light or an automotive front light, the latter also known as headlight or headlamp, comprising at least one light external to the vehicle having the function of illumining and/or signaling, such as, for example, a position light, which may be a front position light, a tail light, a side marker, a turn signal, a brake light, a rear fog lamp, a main beam headlamp, a dipped beam headlamp, and the like.

Furthermore, the term lighting and/or signaling device also means an interior ceiling light, a dashboard or part of it, a display and so on.

Therefore, as better described in greater detail below, in its signaling function the device may comprise the possibility of sending light signals, logos, but also writings and light messages of any kind.

The lighting and/or signaling device 4 comprises a container body or housing 8, usually made of polymeric material, such as acrylonitrile-butadiene-styrene or ABS, which typically allows the fixing of the lighting and/or signaling device 4 to the respective vehicle or any type of support.

For the purposes of the present invention, the container body or housing 8 may have any shape, size or position: for example, the container body 8 may also not be directly connected to the bodywork or other external fixings of the associable vehicle.

As seen, the container body 8 may also be fixed inside the vehicle, e.g., on the dashboard, rear shelf and so on.

The container body 8 delimits a containment housing 12 which accommodates a plurality of components of said lighting and/or signaling device.

In particular, the containment housing 12 accommodates a plurality of light sources 16, preferably LED or laser, arranged and supported within said containment housing 12.

For example, a lenticular body 20 may be placed at least partially to close in the container body 8 to close said containment housing 12 which accommodates the at least one light source 16.

For the purposes of the present invention, the lenticular body 20 may be external to the lighting and/or signaling device 4, so as to define at least one external wall of the lighting and/or signaling device directly subject to the atmosphere.

According to possible embodiments, the material of the lenticular body 20 is polymeric, i.e., a resin such as PMMA (polymethyl methacrylate), PC (polycarbonate) and the like. Said material of the lenticular body is thus at least partially transparent or semi-transparent or translucent and may also comprise one or more opaque portions.

The lenticular body 20 is thus adapted to be crossed, at least partially, by the light beam produced by the light sources 16, which is transmitted outside the containment housing 12, as better described below.

A first light guide 28 made of a transparent polymeric material, such as PC, PMMA or the like, is also accommodated inside the containment housing 12. The light sources 16 accommodated in the containment housing 12 comprise a first light source 24 intended to supply such first light guide 28. The latter is thus configured to receive as input at least partially the light beam produced by the at least one first light source 24, transmits the light beam by total internal reflection along a first prevailing propagation direction X1-X1 and sends the light beam as output from the lenticular body 20. More in detail, the light guide 28 is provided with walls for transmitting the light beam by total internal reflection.

However, such light guide walls may also be involved in a connection of the light guide to the container body, or to any other element accommodated within it, such as a support, a bezel, an opaque element, etc. Therefore, the walls of the light guide form a sort of interface wall between the light guide itself and the element connected to it.

More in detail, the containment housing 12 accommodates at least one fixing and/or screen element 32, formed with an opaque polymeric material, such as ABS or the like, opaque to the light beam, and mechanically connected to the first light guide 28 at a first interface wall 36 intended for the total internal light propagation. In this manner, the fixing and/or screen element 32 optically screens the first interface wall 36, i.e., prevents light from escaping from the first light guide 28 at said first interface wall 36.

Furthermore, the fixing and/or screen element 32 may allow the first light guide 28 to be mechanically connected inside the lighting and/or signaling device 4. Specifically, the fixing and/or screen element 32 is fixed either directly or indirectly onto the container body 8 to mechanically lock the first light guide 28 onto the container body 8 itself.

The first interface wall 36 of the first light guide 28 is fixed to the fixing and/or screen element 32 by a permanent joining technique, such as a known welding process, in particular laser welding, but, as described below, it is also possible to carry out ultrasonic welding, for example.

As known, the laser welding process provides preparing a transparent polymeric element, such as the first light guide 28, an absorbent polymeric element, such as the fixing and/or screen element 32, and a first welding portion 40 obtained by a transparent joint portion 80, obtained in the first light guide 28, and an absorbent joint portion 84 obtained in the absorbent element, i.e., the fixing and/or screen element 32. As seen, the first welding portion 40 is positioned along the first interface wall 36.

The laser welding process further comprises the operation of emitting a laser beam through the transparent polymeric element so that it reaches the absorbent polymeric element. The beam then propagates until it reaches the transparent joint portion 80 and then the absorbent joint portion 84. Due to the energy of the laser beam, the absorbent joint portion 84 melts and transmits heat to the transparent joint portion 80, until the latter also softens. Finally, a mechanical clamping completes the laser welding of both elements.

According to one embodiment, the first light guide 28 is fixed to the fixing and/or screen element 32 at the first welding portion 40 which at least partially projects from the first interface wall 36. In more detail, the first welding portion 40 comprises the transparent joint portion 80 of the first light guide 28 and the absorbent joint portion 84 of the fixing and/or screen element 32 which melt and at least partially penetrate each other.

According to one possible embodiment, the transparent joint portion 80 of the first light guide 28 comprises at least a first male portion 44 protruding directly from the first interface wall 36 of the first light guide 28, along a first direction D substantially perpendicular to a lying plane of the first interface wall 36, while the absorbing joint portion 84 of the fixing and/or screen element 32 is provided with at least a first housing 48 which develops as a pocket or recess, along the same first direction D, relative to the first interface wall 36. Such first housing 48 is adapted to accommodate at least partially said first male portion 44, when the first light guide 28 and the fixing and/or screen element 32 are placed in contact with each other to be permanently connected after welding.

While not absolutely necessary, in one embodiment, the first male portion 44 may assume a conformation similar to a pin, e.g., one millimeter long calculated along the first direction D, while the first housing 48 substantially assumes the shape of a tank, e.g., half a millimeter deep, for example, measured along the same first direction D. In general, before welding, the first housing 48 is configured to accommodate the first male portion 44 only partially: in particular, the height or extension of the first male portion 44 is greater than the height or extension of the first housing 48, measured along said first direction D.

While not exclusively, in one embodiment, the first male portion 48 and the first housing have a circular cross-section relative to a plane perpendicular to said first direction D.

The first male portion 44 may extend under the first interface wall 36 inside the fixing and/or screen element 32.

According to one embodiment, a cross-section of the plan of the first housing 48, measured along a section plane perpendicular to said first direction D, is greater than the cross-section of the first male portion 44, also measured relative to a section plane perpendicular to the first direction D, to allow the collection of the fusion material formed during the welding process.

More in detail, during the welding process, the laser radiation reaches the first housing 48 through the first male portion 44. The first housing 48 heats up and a portion of it softens, transferring heat to the first male portion 44, which in turn heats up and softens. Such softened parts mix together under pressure, forming a substantially opaque melting mixture. The opaque fusion mixture then settles inside the first housing 48, gradually hardening until it solidifies completely at the end of the welding process. By virtue of the fact that the capacity of the first housing 48 is greater than a volume of the first male portion 44, the first housing 48 can collect all the opaque melt mixture so that the first interface wall 36 is maintained substantially clear at the first male portion 48, which is either worn or greatly reduced at the end of the laser welding process. It is apparent at this point that the opaque fusion mixture certainly comprises a portion of the first male portion 44 which is consumed during the laser welding process. Such a portion of the first male portion 44 is substantially defined as the first male portion 44 which exceeds the depth of the first housing 48 along the first direction D.

In one embodiment, the first light guide 28 is fixed to the fixing and/or screen element 32 by a plurality of first welding portions 40, mechanically separated, i.e., spaced, from each other. In other words, the transparent joint portion 80 may comprise a first plurality of male portions 44, while the absorbing joint portion 84 may comprise a corresponding plurality of first housings 48. Such welding carried out in a discontinuous manner, i.e., by a plurality of first welding portions 40, makes it possible to optimize the portion of the first interface wall 36 intended for joining with the fixing and/or screen element 32.

Although the invention is not limited to the laser welding process alone, the latter is preferable to other types of the welding process, such as ultrasonic welding, because no relative movement is provided between the portion of the transparent joint obtained in the first light guide 28 and the absorbent joint portion obtained in the absorbent element. Indeed, such a relative movement produces dust and therefore burrs, which leads to a final aesthetic defect. In particular, the ultrasonic welding process involves rubbing the first male portion 44 inside the first housing 48.

According to one embodiment, the containment housing 12 accommodates at least one second light source 52, adapted to emit a light beam, and a second light guide 56 that receives as input at least partially the light beam produced by said second light source 52, transmit it by total internal reflection along a second prevalent propagation direction X2-X2 and send it as output from the lenticular body 20.

In one embodiment, the second light guide 56 is mechanically fixed to the fixing and/or screen element 32 at a second interface wall 60 of the second light guide 56 intended for the total internal propagation of the light, wherein at least a second welding portion 64 projects from said second interface wall 60.

In this manner, the fixing and/or screen element 32 optically screens the second interface wall 60, i.e., prevents light from escaping from the second light guide 56 at said second interface wall 60.

According to one embodiment, the second interface wall 60 is opposite to the first interface wall 36, and the fixing and/or screen element 32 is arranged between the first light guide 28 and the second light guide 56, to constitute a mechanical and optical separating element between the first light guide 28 and second light guide 56 and also a mechanical fixing to the container body 8 for the first light guide 28 and second light guide 56.

According to one embodiment, the second interface wall 60 of the second light guide 56 is fixed to the fixing and/or screen element 32 using a permanent joining technique, such as a known welding process, in particular laser welding, but, as described below, it is also possible to carry out e.g., ultrasonic welding.

The laser welding process provides preparing a transparent polymeric element, such as the second light guide 56, an absorbent polymeric element, such as the fixing and/or screen element 32, and a second welding portion 64 consisting of a portion of transparent joint 80, obtained in the second light guide 56, and an absorbent joint portion 84 obtained in the absorbent element, i.e., the fixing and/or screen element 32. As shown, the second welding portion 64 is positioned along the second interface wall 60.

The laser welding process further comprises the operation of emitting a laser beam through the transparent polymeric element, consisting of the light guide 56, so that it reaches the absorbing polymeric element, consisting of the fixing and/or screen element 32, so that the light guide 56 and the fixing and/or screen element can be permanently joined together, as described above. According to an embodiment, the second light guide 56 is fixed to the fixing and/or screen element 32 at the second welding portion 64 which at least partially projects from the second interface wall 60. In more detail, the second welding portion 64 comprises the transparent joint portion 80 of the second light guide 56 and the absorbent joint portion 84 of the fixing and/or screen element 32 which melt and at least partially penetrate each other.

According to a possible embodiment, the transparent joint portion 80 of the second light guide 56 comprises at least a second male portion 68 which protrudes directly from the second interface wall 60 of the second light guide 56, along a second direction F substantially perpendicular to a lying plane of the second interface wall 60, while the absorbing joint portion 84 of the fixing and/or screen element 32 is provided with at least one second housing 72 which develops as a pocket or recess, along the same second direction F. Such a second housing 72 is adapted to accommodate at least partially the second male portion 68 when the second light guide 56 and the fixing and/or screen element 32 are placed in contact with each other to be permanently connected after welding.

In one embodiment, the second male portion 68 may assume a conformation similar to a pin, e.g. one millimeter long calculated along the second direction F, while the second housing 72 substantially assumes the shape of a tank, e.g. half a millimeter deep, for example, measured along the same second direction F. In general, before welding, the second housing 72 is configured to accommodate the second male portion 68 only partially: in particular, the height or extension of the second male portion 68 is greater than the height or extension or depth of the second housing 72, measured along the second direction D.

In one embodiment, but not exclusively, the second male portion 68 and the second housing 72 have a circular cross-section relative to a section plane perpendicular to the second direction F.

In addition, the second male portion 68 may extend from the second interface wall 60 inside the fixing and/or screen element 32.

According to an embodiment, a cross-section of the plan of the second housing 72, measured along a section plane perpendicular to the second direction F, is greater than the cross-section of the second male portion 68, also measured relative to a section plane perpendicular to the second direction F, to allow the collection of the fusion material formed during the welding process.

More in detail, during the welding process, the laser radiation reaches the second housing 72 through the second male portion 68. The second housing 72 heats up and a portion of it softens, giving heat to the second male portion 68, which in turn heats up and softens. Such softened parts mix together under pressure, forming a substantially opaque melting mixture. The opaque fusion mixture then settles inside the second housing 72, gradually hardening until it solidifies completely at the end of the welding process. By virtue of the fact that the capacity of the second housing 72 is greater than a volume of the first male portion 68, the second housing 72 can collect all the opaque melt mixture so that the second interface wall 60 is maintained substantially clear at the second male portion 68, which is either worn or greatly reduced at the end of the laser welding process.

It is apparent at this point that the opaque fusion mixture certainly comprises a portion of the second male portion 68 which is consumed during the laser welding process. Such a portion of the second male portion 68 is substantially defined as the second male portion 68 which exceeds the depth of the second housing 72 along the first direction F. In one embodiment, the second light guide 56 is fixed to the fixing and/or screen element 32 by a plurality of second welding portions 64.

According to an embodiment, the second welding portions 64 are staggered relative to the first welding portions 40 with respect to a transverse direction Y-Y, perpendicular to prevailing propagation directions of the light beams within the respective first light guide 28 and second light guides 56.

The assembly method of a lighting and/or signaling device according to the present invention will now be described.

More specifically, the method comprises the steps of:
providing a lighting and/or signaling device as described above,
approaching the first light guide 28 to the fixing and/or screen element 32 at the first interface wall 36,
defining at least one first welding portion 40, at the first interface wall 36, between the first light guide 28 and the fixing and/or screen element 32, where first welding portion 40 is defined by a transparent joint portion 80, obtained in the first light guide 28, and by an absorbing joint portion 84, obtained in the absorbing element, i.e., in the fixing and/or screen element 32.

The method may also include the steps of:
providing a first male portion 44 of the first light guide 28, as a portion of transparent joint 80, where the first male portion 44 protrudes directly from the first interface wall 36 of the first light guide 28,
providing a first housing 48 of the fixing and/or screen element 32, as an absorbing joint portion 84, where the first housing 48 receives at least partially said first male portion 44,
preventively coupling the first male portion 44 into the first housing 48,
sending a laser light beam at the first male portion 44 so that the beam reaches the first housing 48, to form a substantially opaque fusion mixture under pressure, comprising portions of the first housing 48 and first male portion 44,
accommodating the fusion mixture in the first housing 48.

More specifically, the laser light beam is transmitted through the first light guide 28 up to the first male portion 44, until it strikes the first housing 48 which absorbs the light beam not transmitting it, obtaining heating that induces local fusion/welding.

Therefore, it is worth noting that the step of accurate welding carries out a pre-assembly of the first light guide 28 with the fixing and/or screen element 32.

In turn, the fixing and/or screen element 32 can then be fixed either directly or indirectly to the container body 8, so that the first light guide 28 can also be fixed.

Obviously, in the case of a second light guide 56, the spot-welding operation will be carried out in a similar way as described for the first light guide. The fixing and/or screen element 32 can thus create a single optical screen but also a single mechanical fixing to the container body 8 relative to both light guides 28,56.

As can be appreciated from the description above, the present invention makes it possible to overcome the drawbacks presented in the prior art.

In particular, the automotive lighting and/or signaling device according to the present invention makes it possible to achieve an effective and durable fixing of the light guide in the container body. Such a fixing is vibration-free because it is made at portions of light guide used for the transmission of the light beams which propagate inside it for subsequent reflections. In this manner, the fixing of the light guide does not provide particularly large, cantilevered portions, as is the case with known technology solutions.

Furthermore, the present invention avoids the use of glues for fixing the light guides: the welding portions guarantee greater reliability over time compared to the use of glues.

Furthermore, despite the use of welding portions directly on the light guide, there is no risk of compromising the transmission of the light beams inside the light guide by virtue of the specific type of welding and the local spot geometry of the welded portion. In particular, by virtue of the provision of a male portion on the light guide which penetrates inside a housing of the fixing and/or screen element, it neither affects nor compromises in any manner the transmission of the light beams, for total internal reflection, inside the light guide. Equally, the local deformation of the welding portion does not affect the transmission of the light beam inside the light guide because said welding portion is located beyond the interface wall, i.e., on the side of the fixing and/or screen element.

In this manner, overall benefits are obtained in terms of assembly, cost, reliability and durability of the lighting and/or signaling device.

Furthermore, the present invention makes it possible to carry out laser or ultrasonic spot welding, which is particularly efficient, fast and reliable, instead of the solutions of the prior art, which are slower, more complex and therefore more expensive to achieve.

A person skilled in art can make numerous changes and variants to the lighting and/or signaling device and to the assembly methods of the present invention, all contained within the scope of the invention as defined by the following claims to satisfy contingent, specific needs.

The invention claimed is:

1. A lighting and signaling device for automotive vehicles, comprising:
    a container body which delimits a containment housing closed by a lenticular body,
    said containment housing accommodating at least one first light source adapted to emit a light beam,
    said containment housing being closed by the lenticular body adapted to be at least partially crossed by the light beam produced by said at least one first light source, to transmit said light beam outside the containment housing,
    a first light guide that receives as input at least partially the light beam produced by said at least one first light source and transmits the light beam by total internal reflection along a first prevailing propagation direction and sends the light beam as output from the lenticular body, and a second light guide that transmits the light beam by total internal reflection and sends the light beam as output from the lenticular body,
    at least one fixing and/or screen element having first and second interface walls, the fixing and/or screen element being opaque to said light beam and disposed between the first light guide and the second light guide to constitute a mechanical and optical separating element between said first and second light guides, wherein the fixing and/or screen element is associated with the first light guide at said first interface wall, to optically screen the first light guide at said first interface wall, and the fixing and/or screen element is associated with the second light guide at said second interface wall to optically screen the first light guide at said second interface wall,
    wherein the first light guide is fixed to the fixing and/or screen element by at least one first welding portion which comprises a first male portion of the first light guide which is associated with a corresponding first housing of the fixing and/or screen element adapted to be welded to each other,
    wherein the first male portion projects from said first interface wall, along a first direction inside the first housing which develops as a pocket or recess, along the same first direction, relative to the first interface wall, and
    wherein the second light guide is mechanically fixed to the fixing and/or screen element at said second interface wall by at least one second welding portion projecting from said second interface wall.

2. The lighting and/or signaling device as set forth in claim 1, wherein the fixing and/or screen element is fixed either directly or indirectly onto the container body to mechanically lock the first light guide onto the container body.

3. The lighting and/or signaling device as set forth in claim 1, wherein the first male portion and the first housing have a cross-section area of the first housing, relative to a section plane perpendicular to said first direction, greater than an area of the cross-section of the first male portion.

4. The lighting and/or signaling device as set forth in claim 1, wherein the first light guide is fixed to the fixing and/or screen element by a plurality of first welding portions, separated from one another.

5. The lighting and/or signaling device as set forth in claim 1, wherein the containment housing accommodates at least one second light source, adapted to emit a light beam, said second light guide receives as input at least partially the light beam produced by said second light source, transmits the light beam by total internal reflection and sends the light beam as output from the lenticular body.

6. The lighting and/or signaling device as set forth in claim 5, wherein the second interface wall is opposite to the first interface wall.

7. The lighting and/or signaling device as set forth in claim 1, wherein the second light guide is fixed to the fixing and/or screen element by a plurality of second welding portions.

8. The lighting and/or signaling device as set forth in claim 7, wherein said second welding portions are staggered relative to the first welding portions with respect to a transverse direction, perpendicular to the first and second prevailing propagation directions of the light beams within the respective first and second light guides.

9. The lighting and/or signaling device as set forth in claim 1, wherein said at least a second welding portion comprises a second male portion of the second light guide which engages on a corresponding second housing of the fixing and/or screen element.

10. The lighting and/or signaling device as set forth in claim 9, wherein the second welding portion comprises a second male portion of the second light guide which engages on a corresponding second housing of the fixing and/or screen element, wherein the second male portion projects from said second interface wall, along a second direction inside the second housing which develops as a pocket or recess, along the same second direction, relative to the second interface wall.

11. The lighting and/or signaling device as set forth in claim 10, wherein the second male portion and the second housing have a cross-section area of the second housing relative to a section plane perpendicular to said second direction, greater than an area of the cross-section of the second male portion.

12. An assembly method of a lighting and/or signaling device, comprising the steps of:
    providing a lighting and/or signaling device as set forth in claim 1;
    approaching the first light guide to the fixing and/or screen element, and
    making at least one first laser welding portion, at the first interface wall, between the first light guide and the fixing and/or screen element.

13. The assembly method as set forth in claim 12, comprising the steps of:
- providing the first male portion of the first light guide,
- providing the first housing of the fixing and/or screen element, and
- first engaging the first male portion in the first housing, sending a laser light beam at the first male portion to obtain said first welding portion.

14. The assembly method as set forth in claim 13, comprising the step of:
- providing that the first male portion protrudes directly from the first interface wall of the first light guide, along a first direction substantially perpendicular to a lying plane of the first interface wall, and that the first housing develops as a pocket or recess, along the same first direction, relative to the first interface wall,
- wherein, before welding, the first housing is adapted to accommodate only partially said first male portion, when the first light guide and the fixing and/or screen element are placed in mutual contact to be permanently connected after welding.

15. The assembly method as set forth in claim 12, comprising the step of providing that, before welding, a volume of the first housing is greater than a volume of the first male portion, to allow the collection of the melt material formed during the welding process.

16. The assembly method as set forth in claim 12, wherein the first housing contains a substantially opaque melting mixture consisting of a portion of the first male portion melted and mixed together with a portion of the first housing.

* * * * *